United States Patent [19]

Hagle et al.

[11] Patent Number: 5,207,558
[45] Date of Patent: May 4, 1993

[54] THERMALLY ACTUATED VANE FLOW CONTROL

[75] Inventors: Michael P. Hagle, Mason; Paul S. Wilson, Fairfield, both of Ohio; Stephen E. Colby, Grand Ledge, Mich.; Charles A. Snyder, Oxford, Ohio

[73] Assignee: The United States of America as represented by the Secretary of the Air Force, Washington, D.C.

[21] Appl. No.: 785,584

[22] Filed: Oct. 30, 1991

[51] Int. Cl.$^5$ ............................................. F03B 3/18
[52] U.S. Cl. ..................................... 415/161; 415/12; 415/148; 415/160; 415/155; 416/39; 416/132 R; 416/211; 416/223 R
[58] Field of Search ................. 416/39, 132 R, 132 A, 416/211, DIG. 5, 223 R, 223 A, 240; 415/12, 148, 150, 155, 156, 160, 161

[56] References Cited

U.S. PATENT DOCUMENTS

| | | | |
|---|---|---|---|
| 2,055,928 | 9/1936 | Hays | 416/132 |
| 2,918,978 | 12/1959 | Fanti | 416/240 |
| 3,478,987 | 11/1969 | Dorand | 416/240 |
| 3,614,260 | 10/1971 | Ellinger | 416/DIG. 5 |
| 3,954,230 | 5/1976 | Machuta | 416/240 |
| 4,000,868 | 1/1977 | Gregor | 416/240 |
| 4,012,908 | 3/1977 | Dundore | 60/354 |
| 4,135,362 | 1/1979 | Glenn | 60/39.16 R |
| 4,235,397 | 11/1980 | Compton | 416/240 |
| 4,295,784 | 10/1981 | Manning | 416/162 |
| 4,652,208 | 3/1987 | Tameo | 415/162 |
| 4,664,594 | 5/1987 | Mandet et al. | 415/148 |
| 4,705,452 | 11/1987 | Karadimas | 415/161 |
| 4,768,922 | 9/1988 | Kozak et al. | 415/160 |
| 4,856,962 | 8/1989 | McDow | 415/115 |
| 4,861,228 | 8/1989 | Todman | 415/115 |

FOREIGN PATENT DOCUMENTS 0893054 4/1962 United Kingdom ................ 415/161

Primary Examiner—Edward K. Look
Assistant Examiner—Mark Sgantzos

[57] ABSTRACT

Thermally actuated flow diverters for gas turbine engines are provided which include an arrangement of vanes in spaced overlapping array, which direct, e.g. coolant air flow to rotating engine components, each vane having 3 foil components joined at 3 hinge points. That is, a leading foil positioned on the suction side of the vane, a trailing foil pivotably mounted to a rearward portion of such leading foil at a first pivot axis and a third foil positioned on the pressure side of the vane connecting a forward portion of such leading foil and such trailing foil at second and third pivot axes respectively. Either the third foil or the leading foil is fixedly mounted to engine walls of the same material, the other of these two foils defining an actuation link that is expandable and contractable relative to such walls; the third foil having a coefficient of thermal expansion greater than that of the leading foil. The vanes are positioned so that upon temperature change, the third foil contracts or expands relative to the leading foil and pivots the trailing foil toward or away from the leading foil of a downstream vane so as to control the flow of engine coolant therebetween.

11 Claims, 4 Drawing Sheets

THERMALLY ACTUATED VANE FLOW CONTROL

BACKGROUND OF THE INVENTION

1. Field of the Invention

This invention relates to thermally actuated flow area control for gas turbines particularly thermally actuated vane flow control.

2. The Prior Art

Gas turbine engines frequently require cooling air therein, particularly for high pressure turbine and low pressure turbine rotors. For this purpose, stationary vanes have been installed in such engine locations, i.e., upstream of the above turbine rotors, which cannot take into account variations in engine power and gas flow throughput or engine operating temperatures.

Variable coolant control mechanisms have been attempted in the past which relied on actuation schemes requiring extra moving parts or components, dependence on engine control systems. Such components, though providing benefits of cooling air flow modulation, result in weight addition to such engine. For examples of such prior art, variable stator assemblies, see U.S. Pat. No. 4,135,362 to Glenn, U.S. Pat. No. 4,295,784 to Manning, U.S. Pat. No. 4,664,594 to Mandet et al and U.S. Pat. No. 4,856,962 to McDow.

Accordingly, while there have been either stationary air coolant vanes or pivotable or movable vanes, which are actuated by added components in a gas turbine, there has not been variable coolant flow control in a gas turbine that is uncomplex of construction and light of weight which did not require added control elements for operation thereof and there is a need and market for variable coolant flow vane control that obviates the above prior art shortcomings.

There has now been discovered a lightweight variable coolant flow vane control system that is uncomplex of design, light of weight and responsive to gas turbine operating temperatures.

SUMMARY OF THE INVENTION

Broadly the present invention provides thermally actuated flow diverters for gas turbine engines comprising, an array of vanes which direct coolant flow to engine components, the vanes each having a leading foil positioned on the suction side of the vane, a trailing foil pivotably mounted to the leading foil at a first pivot axis and a third foil positioned on the pressure side of the vane connecting the leading foil and the trailing foil at second and third pivot axes. Either the third foil or the leading foil is fixedly mounted to engine walls of the same material, the other of these two foils defining an actuation link that is movable relative to the walls. The third foil has a coefficient of thermal expansion greater than that of the leading foil. The vanes are positioned so that the trailing foil can pivot into proximity with or away from a neighboring engine component, so that upon temperature change, the third foil contracts or expands relative to the leading foil and pivots the trailing foil toward or away from such neighboring engine component, controlling the flow of engine coolant therebetween into eg. the engine turbine rotor.

BRIEF DESCRIPTION OF THE DRAWINGS

The invention will become more apparent from the following detailed specification and drawings in which.

DESCRIPTION OF PREFERRED EMBODIMENTS

Figure 1:
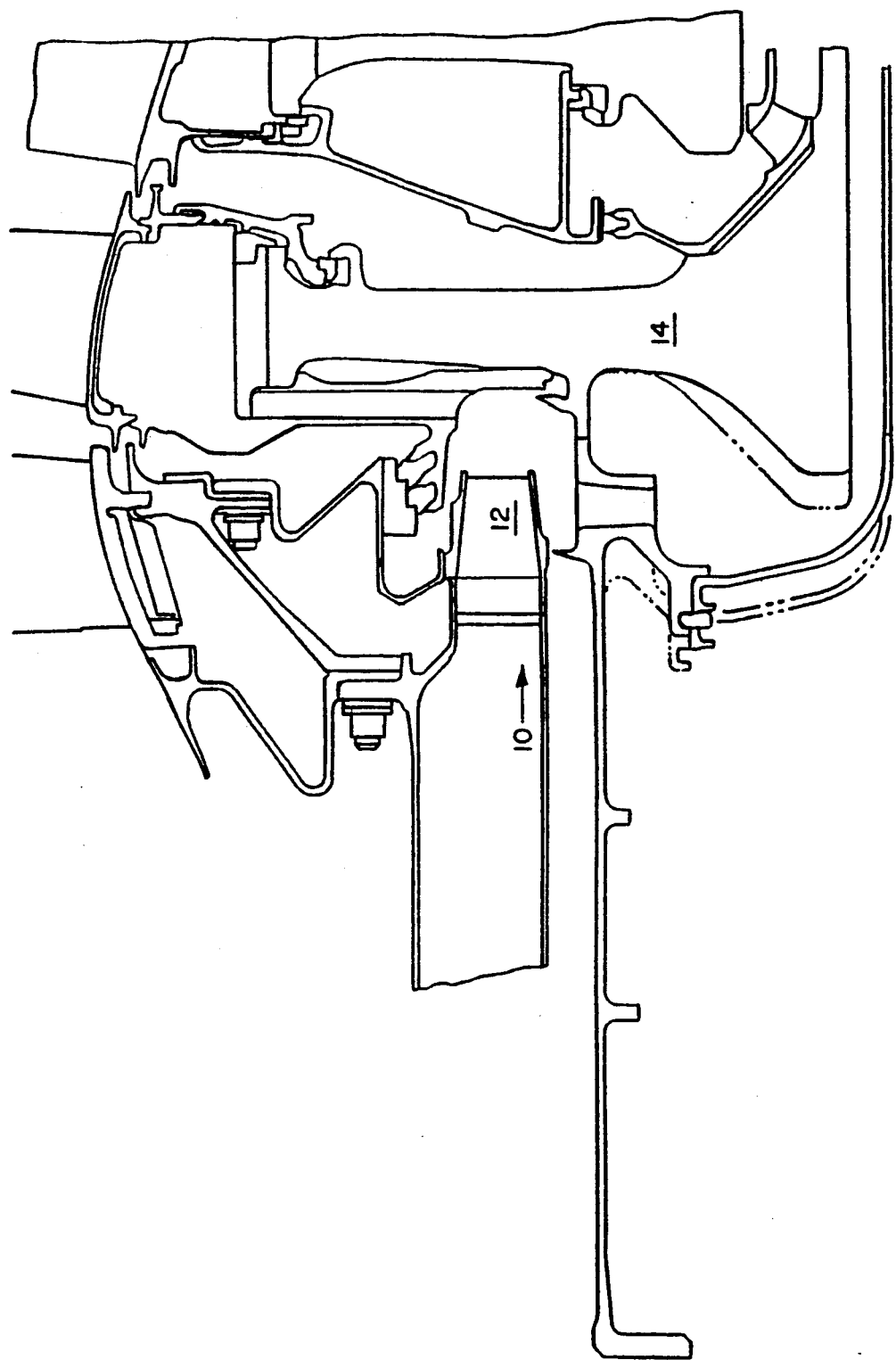
FIG. 1 is a cross-sectional elevation view of a gas turbine engine at the inboard combustor/turbine interface.

Referring in more detail to the drawings, stationary inducer 10 has an array of static airfoil vanes 12 of the prior art, which serve to impart circumferential velocity to the coolant air which is then directed at downstream rotating turbine 14, as shown in FIG. 1.

Figure 2:
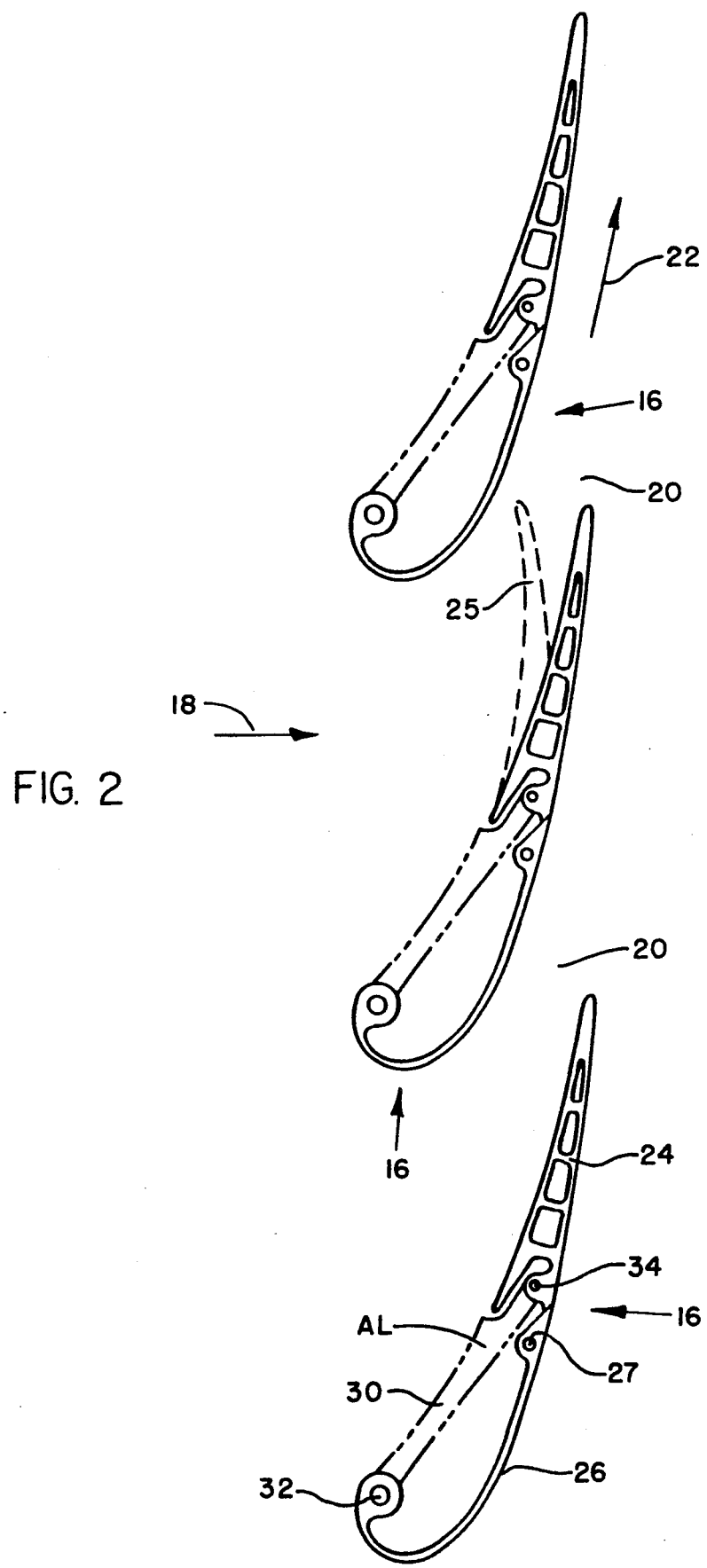
FIG. 2 is a schematic cross sectional plan view of a plurality of thermally actuated vanes according to the present invention.

The airfoil shape cross-sectional outline of the prior art vanes 12 and their overlapping arrangement, is similar to that of the vanes 16 of the present invention shown in FIG. 2. There the similarity ends as the vanes 16 of the invention are not entirely fixedly mounted as discussed below.

Thus, air coolant flow enters the row of airfoils or vanes 16 in the direction of arrow 18, is turned by the airfoil 16 to match the rotor direction and speed and exit through the opening 20 between each pair of vanes 16 in the direction of arrow 22, as shown in FIG. 2. Desireably the vane opening 20 is adjusted to adjust the speed of the coolant therethrough to match or approximate rotor speed.

Controlling the size of the opening 20 between neighboring vanes 16, controls the coolant air flow (direction, speed and volume) through such openings and controls the cooling flow applied to engine components, eg. a turbine such as turbine 14 of FIG. 1. The purpose of the invention is to apply less cooling air (and thus conserve engine power) when the engine components are cool and to open the gap 20 between vanes 16 when engine temperatures are elevated, to apply greater cooling airflow thereto though at a necessary cost in the form of reduced engine power or thrust, which power loss is of course, outweighed by the cooling benefits (applied to the engine components) gained.

The purpose of the thermally actuated vanes of the invention is to provide a vane which automatically closes toward its neighbor when the engine runs cooler and opens away from its neighboring vane, when the engine runs hotter without the addition of weighty control systems thereto. The vane 16 of the invention accomplishes such results as follows.

Figures 3, 4:
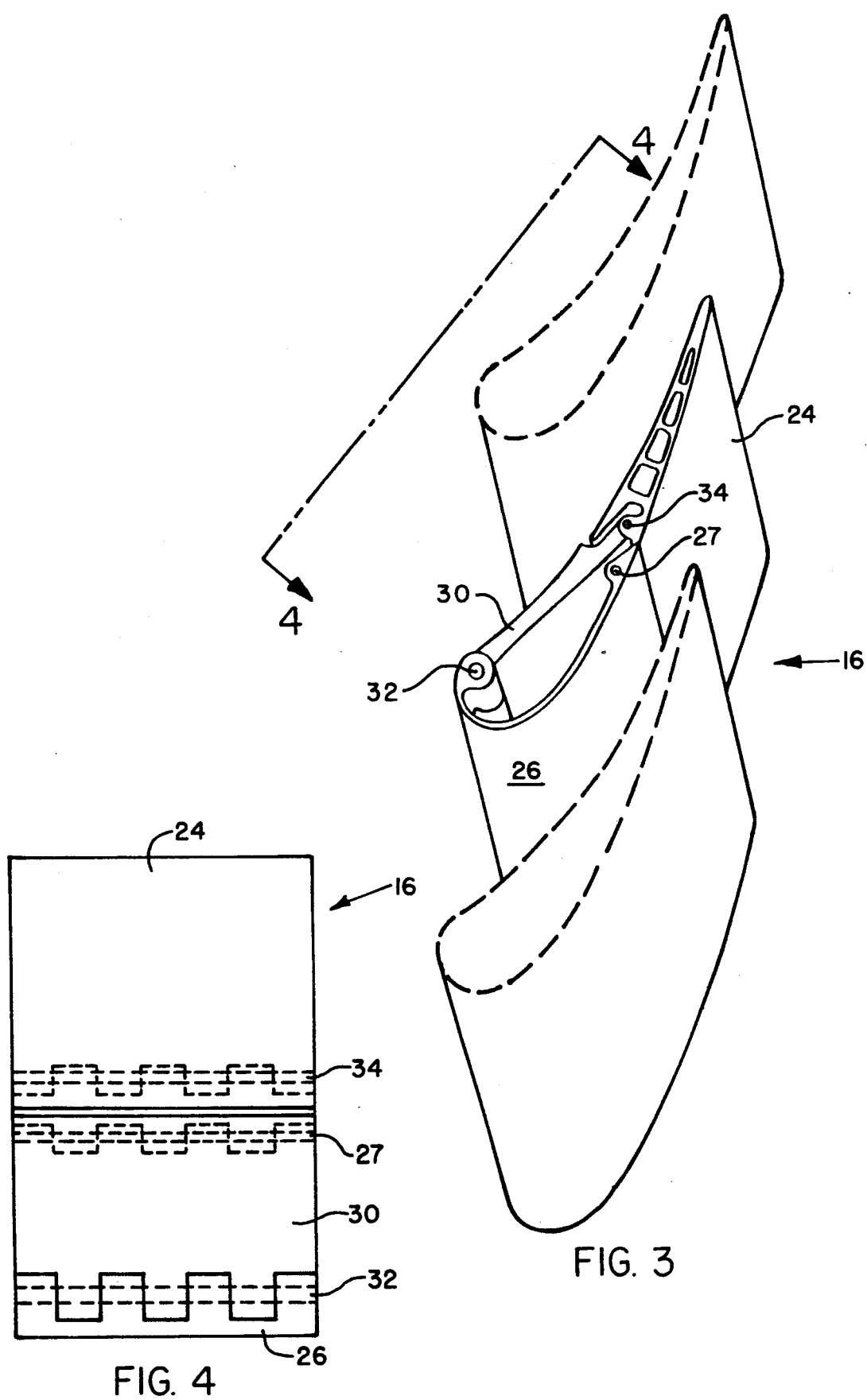
FIG. 3 is a perspective view of the thermally actuated vanes of the invention shown in FIG. 2.
FIG. 4 is an elevation view on the high pressure side of one of the vanes shown in FIG. 3, taken on lines 4—4, looking in the direction of the arrows.

The vane embodiments of the invention each include a three piece airfoil in which one foil is fixedly mounted to engine walls while the other two foils are free to move relative thereto. In the embodiment of FIGS. 2 and 3, it is the leading foil 26 that is so fixedly mounted while in the embodiment of FIG. 5 it is the third foil 42 that is so fixedly mounted.

Referring to the embodiment of FIGS. 2 and 3, movable trailing portion 24 is pivotably connected to static leading foil 26 at hinge pin 27, as shown in FIGS. 2, 3 and 4. The curved shape of leading foil 26 defines the suction side of the vane which, as indicated above, is fixed to the inducer (not shown) at the outer and inner diameters.

The third foil defines an actuation link 30 as well as the pressure side of the vane 16. Such actuation link 30 connects at one end with the leading foil 26 at hinge pin 32 and at the other end thereof with the (pivotable) trailing foil 24 at hinge pin 34, as shown in FIGS. 2, 3 and 4. The coefficient of thermal expansion of the actuation link 30 is necessarily larger than that of the leading foil 26, according to the present invention. This allows such actuation link 30 to contract or expand more than the fixed leading foil 26 at off-design-point engine operating conditions (including temperature).

For example, at engine start-up, when the engine is running relatively cool, the actuation link 30 has sufficiently contracted relative to the leading foil member 26, to pivot the trailing foil 24 to position 25, to close the gap between overlapping vanes 16 and thus diminish the required cooling flow, indicated by arrow 22, as shown in FIG. 2. As engine operating temperatures increase, the actuation link 30 will expand more than that of the leading foil 26, which pivots the trailing foil 24 to a more open position, permitting the passage of greater amounts of cooling air, per arrow 22, to downstream turbine members as needed.

Figure 5:
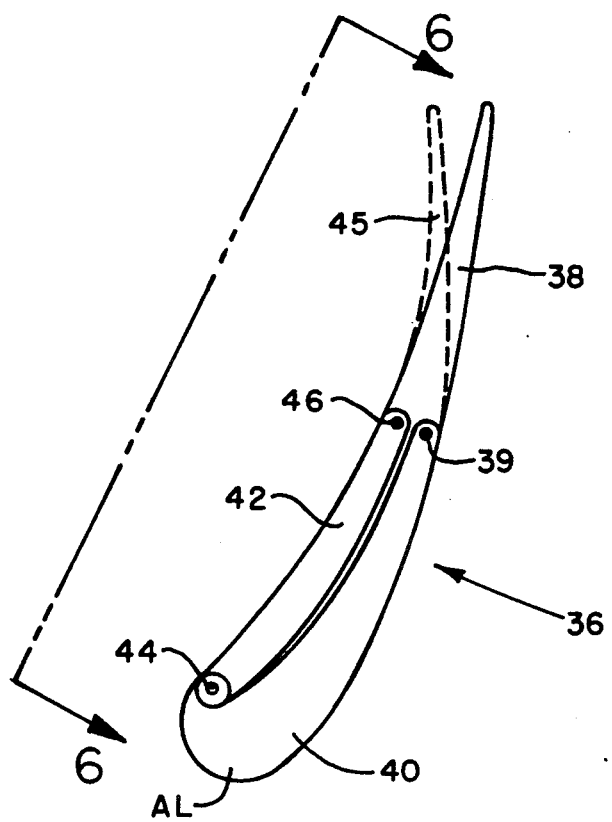
FIG. 5 is a schematic plan view of another embodiment of the thermally actuated vane embodying the invention and FIG. 6 is an elevation view of the vane of FIG. 5, taken on lines 6—6, looking in the direction of the arrows.
Figure 6:
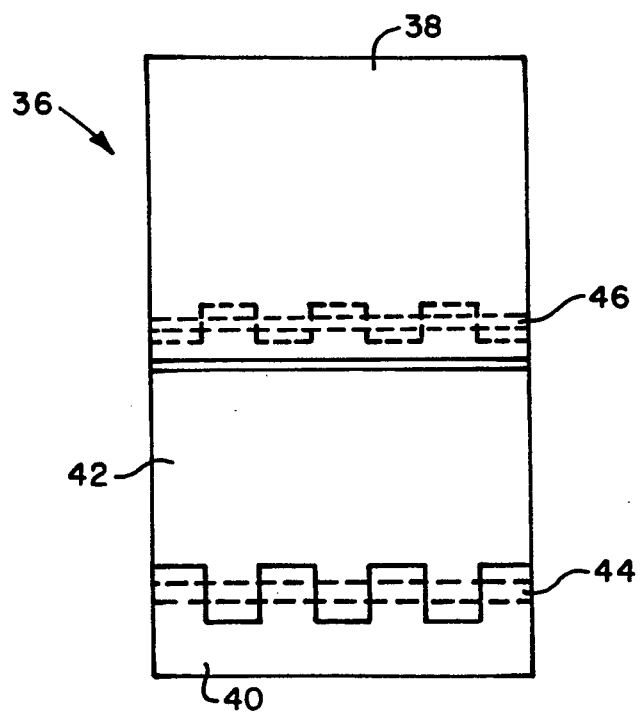

Returning to the embodiment of FIGS. 5 and 6, it is the third foil 40 that is fixedly mounted to the engine walls while the other two foils are free to move so that the leading foil 40 becomes the actuation foil here.

Also, whereas the airfoil members of vane 16 are relatively hollow, except for actuation link 30, as shown in FIG. 3, the 3 foil members of pivoting vane 36, shown in FIGS. 5 and 6, are relatively solid and have different positioning of 2 of the hinge points or pivot points thereof, as shown in FIGS. 5 and 6.

Thus trailing foil member 38, joins to leading (actuation) foil member 40 at hingepin 39, as shown in FIGS. 5 and 6. Fixed third foil 42 connects at one end with the leading foil member 40, at hinge pin 44 and at the other end thereof with the trailing foil member 38, at hinge pin 46, as shown in FIGS. 5 and 6. Again the coefficient of thermal expansion of the third foil 42 is greater than that of the leading foil member 40, which allows such third foil 42 to contract or expand more than that of such leading foil 40, at off-design point engine operating conditions, pivoting such trailing foil 38, e.g. to position 45, under relatively cool engine operating temperatures, e.g. as shown in FIG. 5.

In sum, in one preferred embodiment, the leading foil 26 is statically attached to engine walls of the same material while the third foil 30 is free to contract or expand relative to such walls and thus becomes the actuator link on the pressure side of such vane as shown or indicated in FIGS. 2 and 3. In an alternative embodiment, the third foil 42 is statically attached to the engine walls (not shown) of the same material while the leading foil 40 is not so attached and is free to expand or contract relative to such walls and thus serves as the actuation link for such pivotable vane, as shown in FIGS. 5 and 6.

However, in either the embodiment of FIG. 2 or that of FIG. 5, the third foil has the greater coefficient of thermal expansion or contraction so that, eg. upon reduced temperature operating conditions, such third foil will contract more than the leading foil causing the trailing foil to pivot inwardly toward the neighboring engine component to reduce the flow of coolant therebetween, as indicated by position 25 in FIG. 2 and by position 45 in FIG. 5.

Thus the thermally actuated vane of the invention is well suited for use in stationary inducers (such as inducer 10 shown in FIG. 1) for automatic control of coolant flow supply to turbine sections of gas turbine engines. As noted above, prior art coolant flow supply networks do not incorporate thermally activated pivoting vanes but either those which are stationary or which require the addition of cumbersome and weighty control systems.

The present invention, as discussed above, provides thermally actuated coolant controlled vanes that:
1) have automatic temperature actuation for coolant flow control.
2) are of light weight and uncomplex design, i.e., do not rely on engine control modules.
3) provide increased incident angle at low power (and operating temperature) settings resulting in reduced power transfer losses to rotors and
4) have a streamlined airfoil shape with a pivotable trailing edge thereof that controls coolant flow at the minimum flow area of such vane, reducing power losses.

The components of the flow diverters of the invention are desirably made of nickle alloys, 4 examples of which are given below, with components of each alloy listed below in wt. %:

| Inco 718 | Inco 907 | A286 | Waspaloy |
| --- | --- | --- | --- |
| Ni 52.5% | Ni 37.5% | Ni 25.5% | Ni 57% |
| Cr 19.0% | Co 14.0% | Cr 15.0% | Cr 19.5% |
| Mo 3.0% | Cb/Ta 4.8% | Mo 1.2% | Mo 4.3% |
| Cb/Ta 5.1% | Si .21% | B .006% | B .006% |
| Ti .9% | Ti 1.6% | Ti 2.1% | Ti 3.0% |
| Fe 19.0% | Fe bal. | Fe bal. | Co 13.5% |
| Al .85% | | | Al 1.4% |
| | | | Zr .05% |

The trailing foil 24 and leading foil 26 of vane 16 of the invention shown in FIGS. 2, 3 and 4 can be made of materal such as Inco 907 or ceramic matrix composite herein CMC. CMC can be formed of various ceramic materials, eg. sapphire fibers in a silicon carbide matrix. The third foil or actuation link 30 is a solid member made of metal of greater coefficient of thermal expansion than such leading foil 26 and such actuation link 30 can be made of metal such as Inco 718, A286 or Waspaloy, described above. Preferably the actuation link 30 is made of A286 having a coefficient of thermal expansion in a range of $9-10.2\times10^{-6}/°F$. (eg. 9.5) while the leading foil 26 is preferably made of Inco 907 having a coefficient of thermal expansion in a range of $4.3-5.5\times10^{-6}/°F$. (eg. 5.0). The hollow trailing foil 24 has no requirements of thermal coefficient for proper actuation and can be made of Inco 718, A286 or Waspaloy.

Similarly in thermally actuated vane 36, shown in FIGS. 5 and 6, the trailing foil 38 can be made of Inco 718 and A286 while the leading foil 40 can be made of metal such as Inco 907. The third foil 42 is desirably made of metals of higher coefficient of thermal expansion than the leading foil 40 and can be made of Inco 718 or A286. Preferably the third foil 42 is made of A286 while the leading foil 40 is made of Inco 907.

As indicated in the above discussed embodiments of the thermally actuated vanes of the invention, the foil members can be hollow or solid and the location of the two trailing hinge points can be varied as shown, e.g. in FIGS. 2 and 5. Preferred is the hinge point arrangement shown, eg. in FIGS. 2 and 3. Also, the hinge points described above are defined by hinge pins, as indicated, eg. in FIG. 3.

What is claimed is:

1. Thermally actuated flow diverters for gas turbine engines comprising, an array of vanes which direct coolant flow to engine components, said vanes each having a leading foil positioned on the suction side of said vane, a trailing foil pivotably mounted to said leading foil at a first pivot axis and a third foil positioned on the pressure side of said vane connecting said leading foil and said trailing foil at second and third pivot axes, said third foil or said leading foil being fixedly mounted to engine walls of the same material, the other of these two foils defining an actuation link that is movable relative to said walls, said third foil having a coefficient of thermal expansion greater than that of said leading foil, said vanes being positioned so that said trailing foil can pivot into proximity with or away from a neighboring engine component, so that upon temperature change, said third foil contracts or expands relative to said leading foil and pivots said trailing foil toward or away from said neighboring engine component, controlling the flow of engine coolant therebetween.

2. The thermally actuated vanes of claim 1 wherein said leading foil is fixed and said third foil is said actuator link which is on the pressure side of said vane.

3. The thermally actuated vane of claim 1 wherein said third foil is fixed and said leading foil is said actuator link that is located on the suction side of said vane.

4. The thermally actuated vanes of claim 1 wherein said first, second and third pivot axes are mating pairs of hinge joints, each pair connected by a hinge pin passing therethrough.

5. The thermally actuated vanes of claim 1 being mounted in a stationary inducer of a gas turbine engine upstream of rotating engine components.

6. The thermally actuated vanes of claim 1 wherein said engine component is the leading edge of a neighboring vane.

7. The thermally actuated vanes of claim 3 wherein said vanes are arranged in series overlap.

8. The thermally actuated vanes of claim 1 wherein said foils and actuation link are hollow.

9. The thermally actuated vanes of claim 1 wherein said third foil relatively contracts when said engine operates at reduced temperatures, closing said trailing foil toward said neighboring component.

10. The thermally actuated vanes of claim 1 wherein said third foil is made of A286 having a coefficient of thermal expansion of $9.56 \times 10^{-6}/°F$. and said leading foil is made of Inco 907 having a coefficient of thermal expansion of $5.0 \times 10^{-6}/°F$.

11. The thermally actuated vanes of claim 1 wherein said foils and actuation link are solid.

* * * * *